United States Patent
Rizzardini et al.

(10) Patent No.: US 11,592,911 B2
(45) Date of Patent: Feb. 28, 2023

(54) PREDICTIVE DATA-RECONSTRUCTION SYSTEM AND METHOD FOR A POINTING ELECTRONIC DEVICE

(71) Applicant: STMicroelectronics S.r.l., Agrate Brianza (IT)

(72) Inventors: Federico Rizzardini, Milan (IT);
Lorenzo Bracco, Chivasso (IT);
Stefano Paolo Rivolta, Desio (IT);
Marco Bianco, Cesano Boscone (IT);
Paolo Rosingana, Savigliano (IT);
Alessandra Maria Rizzo Piazza Roncoroni, Abbiategrasso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 16 days.

(21) Appl. No.: 17/191,320

(22) Filed: Mar. 3, 2021

(65) Prior Publication Data
US 2021/0286447 A1 Sep. 16, 2021

(30) Foreign Application Priority Data
Mar. 13, 2020 (IT) .................. 102020000005428

(51) Int. Cl.
*G06F 3/0346* (2013.01)
*G06F 3/038* (2013.01)
*G01P 15/18* (2013.01)

(52) U.S. Cl.
CPC ............ *G06F 3/0346* (2013.01); *G06F 3/038* (2013.01); *G01P 15/18* (2013.01)

(58) Field of Classification Search
CPC ......... G06F 3/0346; G06F 3/038; G01P 15/18
See application file for complete search history.

(56) References Cited

U.S. PATENT DOCUMENTS

| 7,535,456 B2 | 5/2009 | Liberty et al. |
| 8,626,465 B2 * | 1/2014 | Moore ............. G01K 7/42 |
| | | 702/92 |

(Continued)

FOREIGN PATENT DOCUMENTS

WO 2016039921 A1 3/2016

OTHER PUBLICATIONS

Yoshimura, Naoya, et al., "Upsampling Inertial Sensor Data from Wearable Smart Devices using Neural Networks", 2019 IEEE 39th International Conference on Distributed Computing Systems (ICDCS), Jul. 7-10, 2019, Dallas, TX, USA, pp. 1983-1993.

*Primary Examiner* — Bryan Earles
(74) *Attorney, Agent, or Firm* — Slater Matsil, LLP (57) ABSTRACT

A pointing electronic device is provided with: an inertial measurement module, to generate motion input data, indicative of motion of the pointing electronic device, at an input data rate; a pointing determination unit, to implement a pointing algorithm at a processing data rate based on the motion input data, to generate screen-frame displacement data corresponding to 3D-space movements of the pointing electronic device, the processing data rate being higher than the input data rate. The pointing electronic device is further provided with a rate upscaling unit, interposed between the inertial measurement module and the pointing determination unit, to implement a data-rate upscaling of the motion input data, in order to generate upscaled motion input data to be processed by the pointing determination unit at a data rate matching the processing data rate, via a predictive data reconstruction of missing samples based on the actual motion input data.

20 Claims, 4 Drawing Sheets

(56) References Cited

U.S. PATENT DOCUMENTS

| | | | |
|---|---|---|---|
| 9,261,980 B2 | 2/2016 | Bassompiere et al. | |
| 9,929,659 B2* | 3/2018 | Foresta et al. | |
| 9,958,962 B2* | 5/2018 | Grenet | G06F 3/0346 |
| 9,986,069 B2* | 5/2018 | Yeung | H04L 69/04 |
| 10,558,261 B1* | 2/2020 | Zhang | G06F 3/0346 |
| 11,281,250 B2* | 3/2022 | Horn | H04J 3/0697 |
| 2012/0226468 A1* | 9/2012 | Dijkstra | H04Q 9/00 |
| | | | 702/141 |
| 2015/0241244 A1 | 8/2015 | Hsu | |
| 2016/0091955 A1* | 3/2016 | Black | G01D 9/005 |
| | | | 702/189 |
| 2016/0240168 A1* | 8/2016 | Keal | G09G 5/12 |
| 2019/0227093 A1* | 7/2019 | Keal | G01C 21/165 |
| 2019/0331493 A1 | 10/2019 | Bellusci et al. | |
| 2021/0025914 A1* | 1/2021 | Keal | G01C 21/165 |
| 2021/0034171 A1 | 2/2021 | Rivolta et al. | |

* cited by examiner

PREDICTIVE DATA-RECONSTRUCTION SYSTEM AND METHOD FOR A POINTING ELECTRONIC DEVICE

This application claims the benefit of Italian Patent Application No. 102020000005428, filed on Mar. 13, 2020, which application is hereby incorporated herein by reference in its entirety.

TECHNICAL FIELD

The present solution relates to a predictive data-reconstruction system and method, in particular for a pointing electronic device for so called "air-pointer" applications.

BACKGROUND

As it is known, pointing electronic devices include traditional pointers (i.e. devices dedicated to pointing functions) and also smart pens or digital pens or styluses or smart pencils (or similar handheld devices having further and different functions in addition to a pointing function) that are to be coupled to an electronic host apparatus (e.g. a laptop, a tablet, a smart TV, a monitor or a smartphone).

Pointing electronic devices usually implement an HID (Human Interface Device) pointer (or mouse) interface, or protocol, in order to send displacement information (in particular, information associated with a displacement between a current and a previous position) to the host apparatus, in terms of coordinates in a screen-frame of the same host apparatus. A control unit of the host apparatus is thus able to move a displayed object (e.g. a cursor or the like) on the screen-frame based on the received displacement information.

SUMMARY

In accordance with an embodiment, a pointing electronic device includes: an inertial measurement module, configured to generate motion input data, indicative of motion of the pointing electronic device, at an input data rate; a pointing determination unit, configured to implement a pointing algorithm at a processing data rate based on the motion input data, to generate screen-frame displacement data corresponding to 3D-space movements of the pointing electronic device, the input data rate being lower than the processing data rate; and a rate upscaling unit, interposed between the inertial measurement module and the pointing determination unit, configured to implement a data-rate upscaling of the motion input data, in order to generate upscaled motion input data to be processed by the pointing determination unit at a data rate matching the processing data rate, via a predictive data reconstruction of missing samples based on the actual motion input data.

In accordance with another embodiment, an electronic system includes: a host apparatus having a display; and a pointing electronic device in communication with the host apparatus. The pointing electronic device includes: an inertial measurement module, configured to generate motion input data, indicative of motion of the pointing electronic device, at an input data rate; a pointing determination unit, configured to implement a pointing algorithm at a processing data rate based on the motion input data, to generate screen-frame displacement data corresponding to 3D-space movements of the pointing electronic device, the input data rate being lower than the processing data rate; a rate upscaling unit, interposed between the inertial measurement module and the pointing determination unit, configured to implement a data-rate upscaling of the motion input data, in order to generate upscaled motion input data to be processed by the pointing determination unit at a data rate matching the processing data rate, via a predictive data reconstruction of missing samples based on the actual motion input data; and a communication interface unit configured to transmit the screen-frame displacement data to the host apparatus, wherein the screen-frame displacement data are configured to control movement of a displayed element on a screen frame of the display.

In accordance with a further embodiment, a method of generating screen-frame displacement data based on 3D-space movements of a pointing electronic device includes: generating motion input data, indicative of motion of the pointing electronic device, at an input data rate; implementing a pointing determination algorithm at a processing data rate based on the motion input data, to generate the screen-frame displacement data, the input data rate being lower than the processing data rate; and upscaling a data-rate of the motion input data, to generate upscaled motion input data to be processed by the pointing algorithm at a data rate matching the processing data rate, wherein the upscaling comprises performing a predictive data reconstruction of missing samples based on the actual motion input data.

BRIEF DESCRIPTION OF THE DRAWINGS

For a better understanding of the present invention, preferred embodiments thereof are now described, purely by way of non-limiting example and with reference to the attached drawings, wherein.

DETAILED DESCRIPTION OF ILLUSTRATIVE EMBODIMENTS

Figure 1:
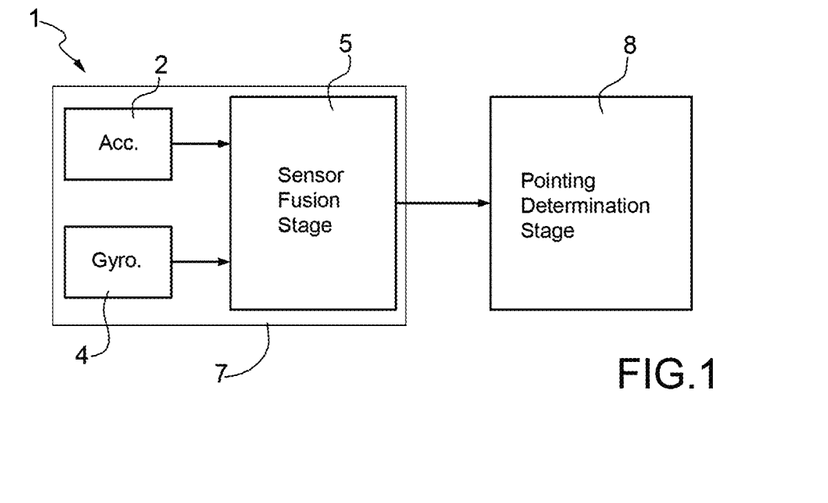
FIG. 1 shows a schematic block diagram of a known pointing electronic device.
Figure 2:
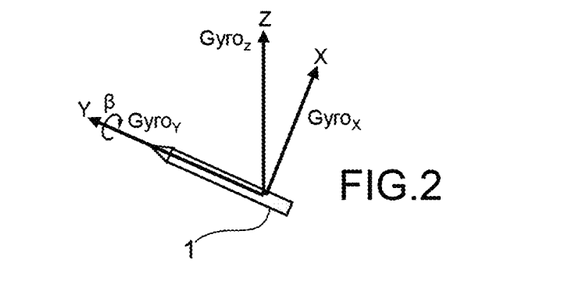
FIG. 2 is a schematic depiction of the pointing electronic device and corresponding gyroscope signal components.

As schematically shown in FIGS. 1 and 2, a known pointing electronic device 1 includes:

a first motion sensor, being an accelerometer sensor 2, in particular a MEMS (Micro Electro Mechanical System) triaxial accelerometer, providing an acceleration signal Acc [x,y,z] indicative of accelerations acting on the pointing electronic device 1 along three axes X, Y, Z of a 3D-space inertial reference system associated with the pointing electronic device 1;

a second motion sensor, being a gyroscope sensor 4, in particular a MEMS triaxial gyroscope, providing a gyroscope signal Gyro[x,y,z] indicative of the angular rate around the three axes X, Y, Z of the 3D-space inertial reference system associated with the pointing electronic device 1; and a sensor-fusion processing unit 5, coupled to the accelerometer sensor 2 and the gyroscope sensor 4, to receive at its input the acceleration signal Acc and the gyroscope signal Gyro, and configured to jointly process the acceleration and gyroscope signals with a 6-DoF (six Degrees of Freedom) sensor fusion algorithm (the inputs of the algorithm being the same acceleration and gyroscope signals Acc, Gyro).

In a possible implementation, the sensor-fusion processing unit 5 is configured to generate at its output a roll estimation quantity β', indicative of the orientation of the pointing electronic device 1, in particular of the roll or tilt angle about its longitudinal axis.

The accelerometer sensor 2, the gyroscope sensor 4 and the sensor-fusion stage 5 forms an inertial measurement module 7, providing at the output one or more of the above acceleration signal Acc[x,y,z], gyroscope signal Gyro and roll estimation quantity β'.

The pointing electronic device 1 further comprises a pointing determination unit 8, coupled to the inertial measurement module 7, configured to receive motion input data and to perform a pointing algorithm for translating the movements of the pointing electronic device 1 in the 3D-space into displacements in a bi-dimensional screen frame (i.e. in a display of a host apparatus coupled to the pointing electronic device 1).

In a possible implementation, the pointing determination unit 8 is configured to receive at its input, as the motion input data, the roll estimation quantity and the gyroscope signal Gyro, to compensate the same gyroscope signal Gyro based on the roll estimation quantity β' and to remap the compensated gyroscope measurements in displacements in the screen frame.

It is noted that the above roll estimation quantity may be an actual estimated roll angle or a different quantity that is indicative of the roll angle and/or from which the same roll angle may be determined.

For example, the sensor fusion unit 5 may be configured to combine the acceleration and gyroscope signals Acc, Gyro with a complementary filter (or any other suitable processing algorithm), and generate at the output a gravity vector estimation, as the above roll estimation quantity. As it is known, the gravity vector, denoted in general with g, is an array of three values [gx,gy,gz], which correspond to the respective projections of the gravity acceleration $\vec{g}$ on the three axes X, Y, Z of the reference system associated with the pointing electronic device 1. The gravity vector is normalized with respect to the value of the acceleration of gravity (about 9, 8 m/s$^2$), thus having a unitary module.

FIG. 2 schematically shows the pointing electronic device 1, the three axes X, Y and Z of an associated reference system and the gyroscope signal Gyro[x, y, z] along the same three axes X, Y and Z. In particular, axis Y represents the axis of longitudinal extension of the pointing electronic device 1; axis X represents a transversal axis, with respect to the same longitudinal extension; and axis Z represents a vertical axis, orthogonal to the horizontal plane defined by the X and Y axes.

Angle β about axis Y represents here the true roll or tilt angle of the pointing electronic device 1, that is ideally used to rotate (compensate) gyroscope signals in order to provide a roll-independent pointer output, since the user cannot be forced to maintain a fixed device orientation during its use. It is indeed noted that rotation of the pointing electronic device 1 around the longitudinal axis does not participate in the pointing operation and thus in the determination of corresponding displacements in the screen-frame.

As it is known, new generation devices (in particular, the above cited smart pens or similar devices) may require a very low-power consumption in order to improve battery life, due to the fact that size, and consequently battery size, is limited and device battery duration is a key design parameter.

Moreover, in some systems, an accurate user experience may be guaranteed, e.g. in terms of accuracy, precision, latency and smoothness of the overall use and operation of the devices, in possible use scenarios.

Since operation of the motion sensors may require a considerable amount of current consumption (particularly in case of active sensor, as the gyroscope sensor, having a moving mass that has to be actuated at a resonance frequency), a known solution to reduce power consumption envisages reducing the sensor output data rate and/or an advanced duty cycling between the different motion sensors, e.g. the accelerometer sensor 2 and the gyroscope sensor 4, which are alternatively set in a power-on or power-off mode, for example in respective intervals of a processing duty cycle.

In known solutions, the sensor output data rate may therefore be lower than the operating (or processing) frequency of the pointing determination unit 8, which determines the final output data rate for the displacement information sent towards the host apparatus coupled to the pointing electronic device 1, for displacement of the displayed object (e.g. the cursor or the like) on the screen-frame. For example, the pointing determination unit 8 may operate at a processing data rate that is double the sensor output data rate (the processing data rate may be e.g. at 25 Hz and the sensor output data rate may be at 12.5 Hz).

As a consequence, in known solutions, either the processing data rate of the pointing determination unit 8 is lowered to match the sensor output data rate, or the sensor output data are duplicated for the processing by the pointing determination unit 8, so as to achieve a sensor output data rate matching the processing data rate. This may entail a decrease in the user experience, in particular with respect to the display of the cursor movement in the screen-frame.

Figure 3:
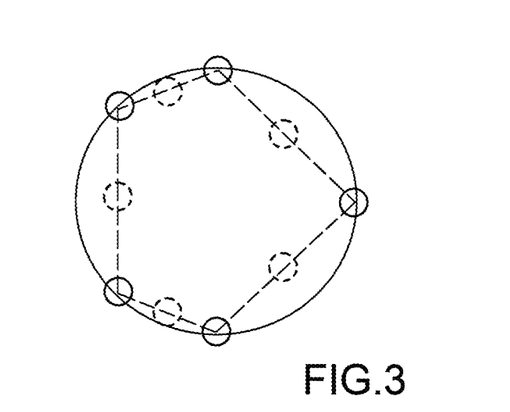
FIG. 3 schematically shows a plot of cursor displacement in a screen-frame, compared to the actual movement of the pointing electronic device, with cursor positions computed according to a known prior art solution.

In this regard, FIG. 3 shows with a solid line the movement of the pointing electronic device 1, in the example with the user "air-drawing" a circular shape; the dashed line represents instead the shape "drawn" by the cursor displayed on the screen-frame of the host apparatus, based on the displacement information provided by the pointing determination unit 8.

Moreover, the solid and dashed circles represent the positions of the cursor as updated by the pointing determination unit 8 (at each execution of the corresponding pointing algorithm), with the above dashed line being the line joining the various positions. In particular, the solid circles represent the positions determined by the pointing algorithm based on actual motion data sensed by the motion sensors, while the dashed circles represent the positions determined based on duplicated motion data (which are thus located at the middle of the line joining two consecutive solid circles).

It is clear that, in both solutions, the user experiences a cursor movement that is evidently different from the actual movement of the pointing electronic device 1 (in other words the user experiences a visible "jerkiness" of the cursor movement); in particular, also in case the motion sensor input data are duplicated, the cursor path remains the same as for the case where a reduced processing data rate is used by the pointing determination unit 8 (with only the solid-circle positions of the cursor being computed), with substantially the same resulting decrease of performance.

In some embodiments of the present invention, the above-mentioned power consumption and user experience issues may be addressed.

As will be discussed in detail in the following, an aspect of the present solution envisages maintaining the desired value of the processing data rate of the pointing determination unit 8 (i.e. without reducing the same value to match the sensor output data rate) with a proper upscaling of the motion input data rate, in particular via a predictive data reconstruction of missing samples, based on the actual motion data sensed by the motion sensors (it is noted that in this context "missing samples" do not refer to samples lost but to samples that have to be reconstructed due to a lower sampling data rate).

Figure 4:
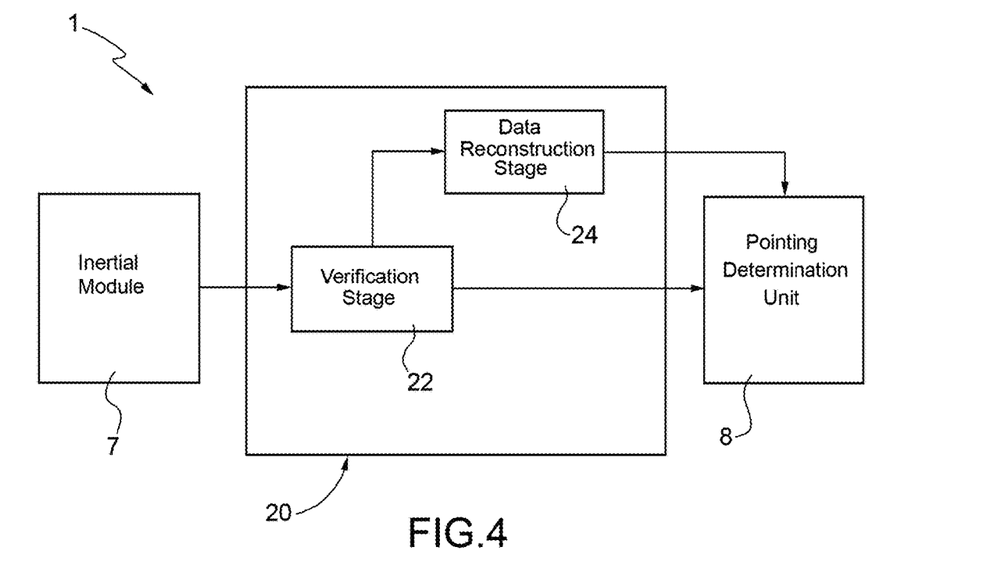
FIG. 4 shows a schematic and simplified block diagram of a pointing electronic device according to the present solution.

As shown in FIG. 4 (where same references are used to denote similar elements as those shown in FIG. 1, which are therefore not discussed again), the pointing electronic device 1 further comprises a rate upscaling unit 20, interposed between the output of the inertial measurement module 7 and the input of the pointing determination unit 8, configured to implement a data-rate upscaling of the motion input data, in order to generate upscaled motion input data to be processed by the same pointing determination unit 8 with a data rate matching the processing data rate of the pointing determination unit 8 (as a non-limiting example, the processing data rate being double than the data rate of the original motion input data, e.g. at 25 Hz against at 12.5 Hz).

The rate upscaling unit 20, operating at the processing data rate, comprises a verification stage 22, which acquires the motion input data from the inertial measurement module 7 (as in the embodiment discussed above, with reference to FIG. 1, the motion input data may include the roll estimation quantity β', e.g. the gravity vector G processed by the sensor-fusion stage 5, and the gyroscope signal Gyro) and a data reconstruction stage 24, which is configured to perform a predictive data reconstruction in case of missing samples of the same motion input data.

It is noted that, in another possible embodiment, the rate upscaling unit 20 may receive as motion input data the acceleration and gyroscope signal data, again at a lower data rate; in this embodiment, the sensor fusion stage 5 may be interposed between the rate upscaling unit 20 and the pointing determination unit 8 (i.e. being not included in the inertial measurement module 7).

In particular, the verification stage 22 is configured to determine, at every cycle, or iteration, of the pointing algorithm implemented by the pointing determination unit 8 (at time intervals corresponding to the processing data rate) the need to reconstruct the motion input data.

In more details, at every cycle, a new or current value (i.e. sample) read for the motion input data is compared to an old or previous value (i.e. sample) acquired at a previous cycle (in particular, a bit-by-bit or bitwise data comparison is implemented for this comparison). It is noted that the old value is available to be read, e.g. at output registers of the motion sensors and/or of the sensor-fusion processing unit 5, even when the same motion sensors are in a power-off mode; accordingly, at every cycle, all motion input data (e.g. both the gravity vector G and the gyroscope signal Gyro) are read (either being new sensed data or stored previous data).

If the new value for the motion input data equals the old value (in particular, according to the above bitwise comparison), this means that the corresponding output register (or analogous storage element) was not rewritten and that the current sample of the motion input data is missing (i.e. it has to be reconstructed due to the lower input data rate); therefore, execution of the data reconstruction stage 24 is enabled, in order to reconstruct the missing sample, via the predictive data-reconstruction.

If, instead, the new value read for the motion input data differs from the old value (in particular, according to the same bitwise comparison), the new value of the motion input data is directly provided to the pointing determination unit 8, as the current sample to be processed by the pointing algorithm (in other words, the current sample is an actual motion data sensed and provided by the inertial measurement module 7).

It is noted that the verification stage 22 is configured to perform the verification for each element of the motion input data, e.g. for both the gravity vector G and the gyroscope signal Gyro and in particular for each of the components thereof along the X, Y, Z axes.

Figure 5:
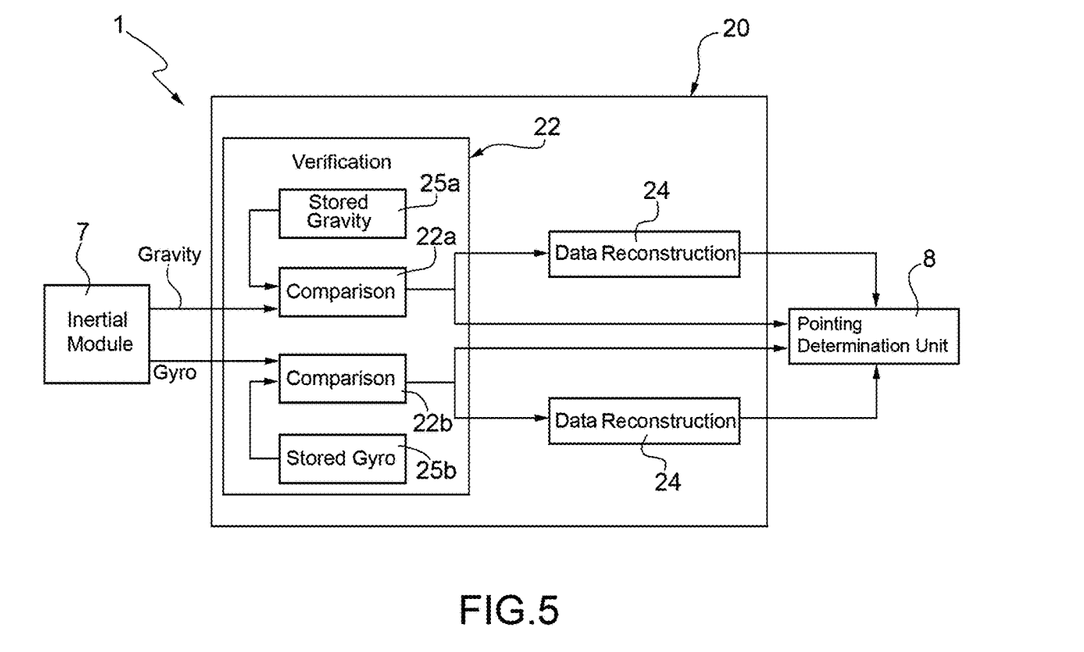
FIG. 5 shows a schematic and simplified block diagram of the pointing electronic device according to a possible embodiment.

As shown in FIG. 5, in the embodiment where the motion input data include the gravity vector G and the gyroscope signal Gyro, the verification stage 22 includes: a first verification block 22a, configured to receive, at each processing cycle, the gravity vector G, in particular, a new sample for each of the axis X, Y, Z, and to perform the comparison with the old value stored for the same gravity vector (again, for each of the axis X, Y, Z), being stored in a first storage element 25a (the first storage element 25a therefore storing the values received at the previous cycle or iteration of the processing algorithm); and a second verification block 22b, separate and distinct with respect to the first verification block 22a, configured to receive the gyroscope signal Gyro, in particular, the new sample for each of the axis X, Y, Z, and to perform the comparison with the old value for the same gyroscope signal Gyro (again, for each of the axis X, Y, Z), stored in a second storage element 25b.

A respective data reconstruction stage 24 is provided at the output of each of the first and second verification blocks 22a, 22b, being executed in case the new value for each of the axis X, Y, Z equals the old value for each corresponding axis X, Y, Z; otherwise, the same new value is sent as the current sample for processing by the pointing determination unit 8.

Figure 6:
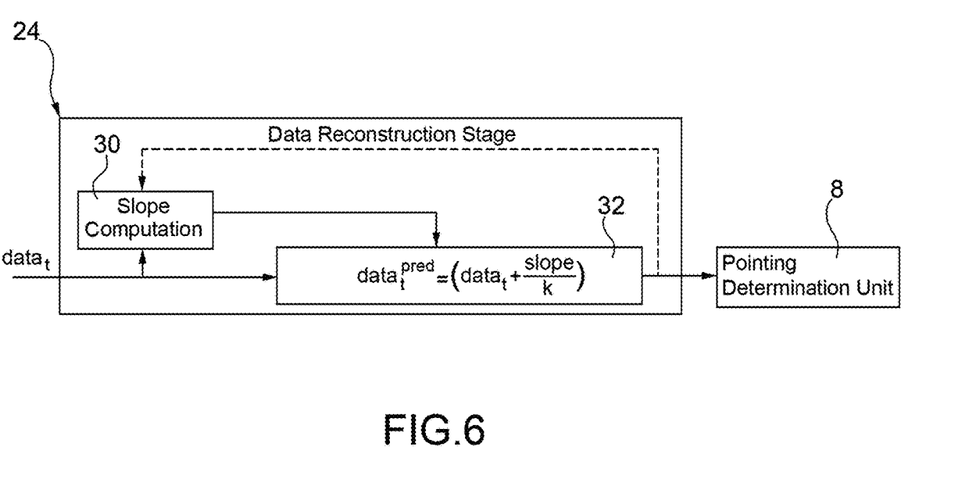
FIG. 6 is a schematic block diagram of a data reconstruction unit in the pointing electronic device, according to an aspect of the present solution.

In more details, and with reference to FIG. 6, the above discussed data reconstruction stage 24 is configured to receive at its input a current sample of the motion input data, here denoted in general with $data_t$ (representing a generic sample, at a current time t, of motion input data, e.g. of any of the components of the gravity vector or gyroscope signal Gyro, along any of the axes X, Y, Z) and to generate at the output a reconstructed (or predicted) data sample $data_t^{pred}$ to be provided to the pointing determination unit 8 for processing by the pointing algorithm; it is noted that the data-reconstruction procedure is repeated for each and every axes of each and every motion input data element (in the example, of the gravity vector G and of the gyroscope signal Gyro).

It is also noted that $data_t = data_{t-1}$ (where datat−1 represents the old sample, i.e. the sample at the previous cycle), since the data reconstruction stage 24 is enabled when the verification stage 22 determines matching between the new ($data_t$) and the old ($data_{t-1}$) samples.

In various embodiments, the pointing algorithm implemented by pointing determination unit 8 may be implemented using pointing algorithms known in the art. In one embodiment, the pointing algorithm disclosed in U.S. patent application Ser. No. 16/932,467 may be used. In this example, the pointing determination stage 8 receives as the inputs of the pointing algorithm, from the sensor-fusion processing stage 5, the gravity vector g[$g_x$, $g_y$, $g_z$](generated by the same sensor-fusion processing stage 5 with a 6-DoF sensor-fusion algorithm based on the accelerometric and gyroscopic signals); and the same gyroscopic signal Gyro[x, y, z].

The pointing determination stage 8 then performs an operation of axes selection. In particular, in order to avoid waste of resources, one gyroscope axis (the one representing the roll) can be removed from the subsequent computations: in the case of using an East North Up (ENU) reference system, the Y axis may be ignored in some embodiments.

The pointing determination stage 8 then performs a one-axis roll (or tilt) compensation of the gyroscopic signal Gyro[x, y, z] received at its input, in order to provide a natural user experience with any orientation of the electronic device 1 (i.e., independent from any rotation of the same electronic device 1 around its longitudinal axis, the Y axis in the above defined ENU orientation).

In order to perform the roll compensation operation, the input gyroscopic signal Gyro is back-rotated using a roll rotation matrix, according to the following expression:

$$\begin{bmatrix} Gyro'_x \\ Gyro'_y \\ Gyro'_z \end{bmatrix} = \begin{bmatrix} \cos\theta & 0 & -\sin\theta \\ 0 & 1 & 0 \\ \sin\theta & 0 & \cos\theta \end{bmatrix}^{-1} \begin{bmatrix} Gyro_x \\ Gyro_y \\ Gyro_z \end{bmatrix}$$

where θ is the roll angle, Gyro is the input gyroscopic signal defined by vector [$Gyro_x$, $Gyro_y$, $Gyro_z$] and Gyro' is the roll-compensated gyroscopic signal defined by vector [$Gyro'_x$, $Gyro'_y$, $Gyro'_z$].

In some embodiments, instead of computing the roll angle θ and calculating cos θ and sin θ (with computationally expensive trigonometric function), the same quantities are determined based on a processed gravity vector g'. In particular, the processed gravity vector g' corresponds to the 6-DoF gravity vector g, re-normalized using X and Z axes only:

$$g' = \begin{bmatrix} g'_x \\ 0 \\ g'_z \end{bmatrix}$$

wherein:

$$g'_x = \frac{g_x}{\sqrt{g_x^2 + g_z^2}}$$

$$g'_z = \frac{g_z}{\sqrt{g_x^2 + g_z^2}}$$

$g'_x$ and $g'_z$ being the components along the X axis and, respectively, along the Z axis of the processed gravity vector g'.

According to the above expressions, it follows that:

$$\sin\theta = -g'_x$$

$$\cos\theta = g'_z$$

$$\sin^2\theta + \cos^2\theta = 1$$

Substituting the above expressions for cos θ and sin θ in the above back-rotation expression and discarding the Y-axis component as specified above (referring to the axes selection operation at step 21), the components of the roll-compensated gyroscopic signal Gyro' along the X and Z axes can be expressed as:

$$Gyro'_x = Gyro_x \cdot g'_z - Gyro_z \cdot g'_x$$

$$Gyro'_z = Gyro_x \cdot g'_x + Gyro_z \cdot g'_z$$

The pointing determination stage 8 then implements a remapping of the angular rate of the electronic device 1 into displacements into the screen-frame space coordinates, denoted in the following as [x', y']. For example, axes remapping can be implemented as follows:

$$x' = -Gyro'_z \cdot \sigma$$

$$y' = -Gyro'_x \cdot \sigma$$

The above expressions corresponds to selection of the compensated yaw rate (i.e., the component of the roll-compensated gyroscopic signal Gyro' along the Z axis) as the x' displacement in the screen frame; and the compensated pitch rate (i.e., the component of the roll-compensated gyroscopic signal Gyro' along the X axis) as the y' displacement in the same screen frame; the two values are multiplied by −1 in order to be correctly remapped into screen space.

Moreover, multiplication by a scale factor σ, being indicative of the pointer sensitivity, may applied in order to get a desired pointer speed, i.e., a desired movement speed of the cursor or other element displayed on the screen and moving according to the displacement information provided by the electronic device 1 to the host apparatus. The pointing determination stage 8 then outputs the computed [x', y'] values of displacement.

It should be understood that that the pointing algorithm described above is just one example of a number of possible pointing algorithms that may be implemented in embodiments of the present invention.

The data reconstruction stage 24 comprises a slope-computation block 30, which is configured to compute the "slope" of the motion input data, for example as the difference (i.e. digital derivative) between the two previous samples (the information required for the computation being extracted from recent history, suitably stored in a storing element, here not shown) according to the following expression:

$$\text{slope} = data_t - data_{t-2} \quad (1)$$

where $data_{t-2}$ (with $data_{t-2} = data_{t-3}$ for the same reason discussed above) represents the first previous different sample, i.e. the sample preceding the old sample $data_{t-1}$, in other words the sample at the still previous processing cycle.

It is noted that expression (1) envisages use of only real samples, i.e. actual motion data sensed by the motion sensors.

As an alternative (as shown by the dashed line in FIG. 6), reconstructed samples may also be used in the determination of the slope, e.g. according to the following expression:

$$\text{slope} = data_t - data_{t-2}^{pred} \quad (2)$$

where $data_{t-2}^{pred}$ is the reconstructed (or predicted) data sample at the previous execution of the data-reconstruction stage 24 (it is again noted that $data_{t-1}$ represents instead an actual motion data sensed by the motion sensors or determined based on the sensed data).

Use of only real data samples for the prediction is generally more conservative, with less possible errors but generally less prediction capability; while the use also of predicted data samples may lead to more prediction capability (in particular, with respect to signal peak prediction) but with possible higher errors.

The data reconstruction stage 24 further comprises a reconstruction block 32, configured to generate the reconstructed data sample $data_t^{pred}$ to be provided to the pointing determination unit 8, based on the current sample $data_t$ and on the slope computed by the slope-computation block 30, in particular according to the following expression:

$$data_t^{pred} = data_t + \frac{\text{slope}}{k} \quad (3)$$

where k is a weight factor (with k≥1), designed to properly weigh the slope contribution in the data prediction.

In particular, in the above expression (3) it is evident that if k=1, all the computed slope is used to determine the reconstructed data sample $data_t^{pred}$ (in other words, the computed slope is predicted to remain unchanged); values of the weight factor k progressively higher than 1 instead determine a progressive reduction of the slope in the determination of the reconstructed data sample $data_t^{pred}$. For example, a value of k=2 could be used in the data reconstruction stage 24.

According to a particular aspect of the present solution, the data reconstruction stage 24 is configured to implement an additional algorithm to dynamically compute the value of the weight factor k, based on the characteristics of the motion input data, in order to minimize the error in the prediction of the reconstructed data sample $data_t^{pred}$.

Figure 7:
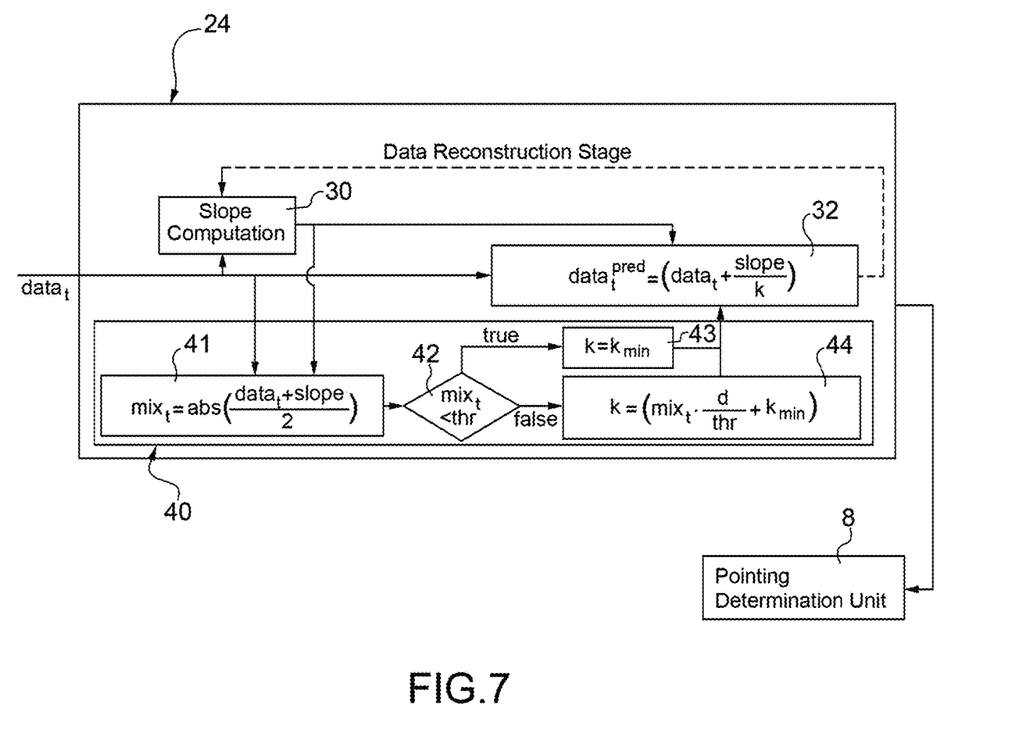
FIG. 7 is a schematic block diagram of the data reconstruction unit, according to an embodiment of the present solution.

As shown in FIG. 7, the data reconstruction stage 24 in a possible embodiment further comprises a weight computation branch 40, configured to dynamically compute the value of the weight factor k, and provide the computed value to the reconstruction block 32, where it is used to determine the reconstructed data sample $data_t^{pred}$ according to the above expression (3).

The weight computation branch 40 comprises a first computation block 41, configured to compute a motion quantity parameter $mix_t$, indicative of a current (i.e. at the current cycle and current time t) quantity of motion associated to the motion input data.

According to a possible embodiment, the first computation block 41 receives at its input the slope computed by the slope-computation block 30 and the current data sample $data_t$, and computes the motion quantity parameter $mix_t$ based on the following expression:

$$mix_t = \text{abs}\left(\frac{data_t + \text{slope}}{2}\right). \quad (4)$$

It is underlined, however, that other possible and more complex solutions may be implemented in the first computation block 41 to determine the quantity-of-motion parameter, e.g. envisaging evaluation of the variance of motion input data, the average, or maximum and minimum of the same motion input data in a given time interval.

The weight computation branch 40 moreover comprises an evaluation block 42, coupled to the first computation block 41 to receive the motion quantity parameter $mix_t$ and configured to compare the same motion quantity parameter $mix_t$ with a given and fixed threshold thr.

In case the motion quantity parameter $mix_t$ is lower than this threshold thr, in a second computation block 43 of the weight computation branch 40 the weight factor k is set to a minimum value $k_{min}$ (for example equal or close to 1). In this case, since the quantity of motion is determined to be small (or in any case lower than the threshold thr), the slope is attributed a high weight in the determination of the reconstructed data sample $data_t^{pred}$.

Instead, in case the motion quantity parameter $mix_t$ is higher than (or equal to) the same threshold thr, in a third computation block 44 of the weight computation branch 40, the weight factor k is computed as a function of the same motion quantity parameter $mix_t$, in particular as a function of the ratio between the motion quantity parameter $mix_t$ and the threshold thr, according to the following expression:

$$k = \left(mix_t \cdot \frac{d}{thr} + k_{min}\right) \quad (4)$$

where d is a proportionality factor, which determines the additional contribution of the above ratio between the motion quantity parameter $mix_t$ and the threshold thr with respect to the minimum value $k_{min}$, for the computation of the weight factor and the determination of the reconstructed data sample $data_t^{pred}$.

It is underlined that the values of the above threshold thr, minimum value $k_{min}$ and proportionality factor d may advantageously be determined via a regression analysis.

In a known manner, this regression analysis may envisage the use of a reference motion data signal sampled at the same rate of the pointing determination unit processing rate; the generation of subsampled data (e.g. by a factor of 2); the execution of several simulations with different combinations of the above parameters thr, $k_{min}$, d; and, final, the selection of the parameter values which minimize the error between the reference motion data signal and the reconstructed one.

Figure 8:
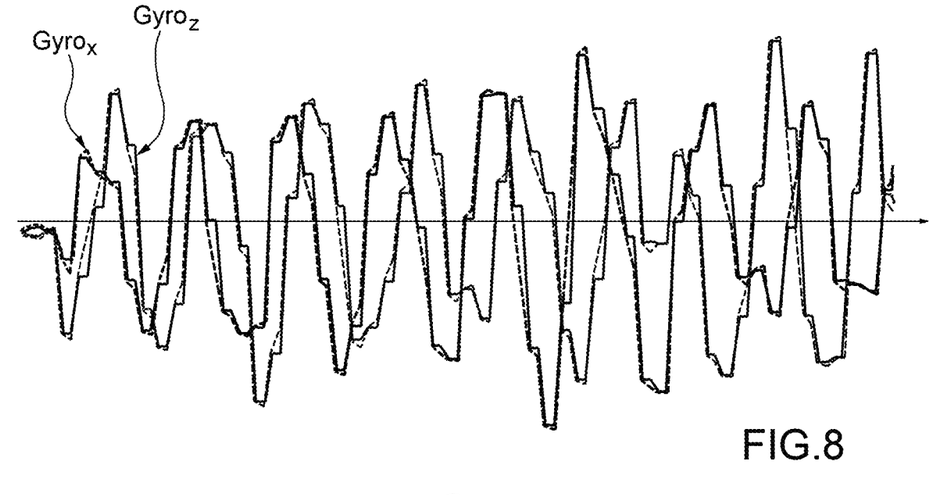
FIG. 8 shows plots of reconstructed motion data, compared to sensed motion data.

FIG. 8 shows an exemplary performance of the above discussed predictive data-reconstruction, for the reconstruction of missing samples of the components of the gyroscope signal Gyro along the axes X and Z.

It is noted that the reconstructed signals (shown in dashed line) closely follows the actual gyroscope signals (shown in solid lines); in particular, it is noted that the disclosed predictive data-reconstruction allows an accurate reconstruction of the signal peaks.

Figure 9:
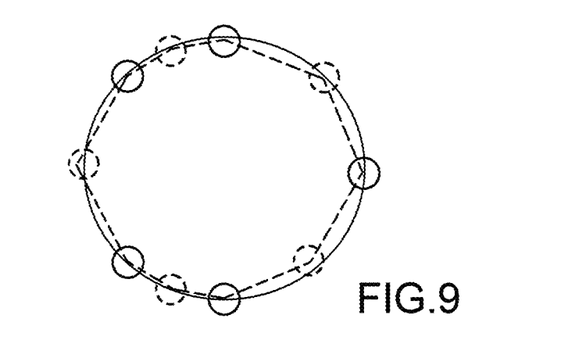
FIG. 9 schematically shows a plot of cursor displacement in a screen-frame, compared to the actual movement of the pointing electronic device, with cursor positions computed according to the present solution.

In a manner corresponding to what shown in the above-discussed FIG. 3, FIG. 9 shows with a solid line the movement of the pointing electronic device 1, again, as an example, with the user "air-drawing" a circular shape; the dashed line represents the shape "drawn" by the cursor displayed on the screen-frame of the host apparatus, based on the displacement information provided by the pointing determination unit 8.

Also in this case, the solid circles represent the positions determined by the pointing algorithm based on actual motion data sensed by the motion sensors, while the dashed circles represent the positions determined, in this case, based on the upscaled motion input data generated by the rate upscaling unit 20 (which are very close to the actual circular shape drawn by the user).

In this case, the user thus experiences a cursor movement that is updated at a high frequency (corresponding to the processing data rate) and is very close to actual movement of the pointing electronic device 1, with an overall improved user experience in the use of the same pointing electronic device 1.

Figure 10:
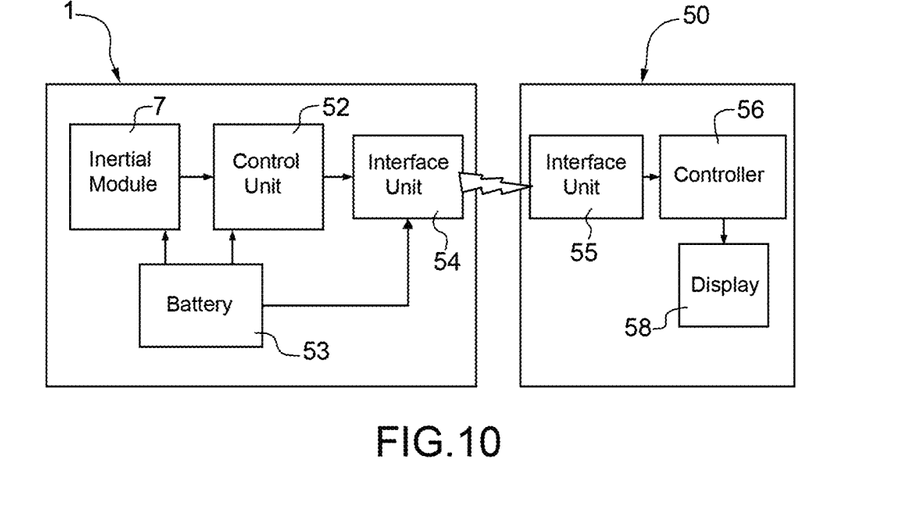
FIG. 10 is a schematic block diagram of a system comprising the pointing electronic device and a host apparatus.

FIG. 10 schematically shows the pointing electronic device 1, for example of the hand-held or portable type, e.g. a smart pen or stylus, communicatively coupled to a host apparatus 50, for example a smartphone, a phablet or a tablet.

The pointing electronic device 1 comprises, within a case or housing thereof, the inertial measurement module 7, in a possible embodiment made as a 6 DoF (Degrees of Freedom) hardware module including (in a manner not shown in detail) the accelerometer sensor 2, the gyroscope sensor 4 and the sensor-fusion stage 5 (both accelerometer and gyroscope sensors 2, 4 and the sensor-fusion stage 5, e.g. made as an ASIC—Application Specific Integrated Circuit, may be integrated in a same packaged chip).

According to a possible embodiment, the pointing determination stage 8 may be implemented in a main control unit 52 of the pointing electronic device 1, having a microcontroller (or similar processing or computing unit) and a suitable non-volatile memory storing computing instructions to execute the pointing algorithm and generate at the output displacement information to be received by the coupled host apparatus 50 to implement a user interface (for example for moving the cursor or similar displayed element on the screen frame of the same coupled host apparatus 50). The main control unit 52 implementing the pointing determination stage 8 may be a dedicated control unit, or may also have other functions, e.g. for controlling the general operation of the pointing electronic device 1.

The pointing electronic device 1 may further comprise: a battery 53, providing a power supply to the hardware module (including the accelerometer sensor 2, the gyroscope sensor 4 and the sensor-fusion stage 5) and to the control unit 52 (implementing the pointing determination stage 8); and a communication interface unit 54, designed for wireless communication towards the host apparatus 50. The communication interface unit 54 may be implemented by a BLE (Bluetooth Low Energy) control unit implementing a Bluetooth low-power wireless communication between the pointing electronic device 1 and the coupled host apparatus 50.

The same host apparatus 50 may comprise: a respective communication interface unit 55, to communicate with the communication interface unit 54 of the pointing electronic device 1; a main controller 56, e.g. a microprocessor unit; and a display 58, defining the screen frame, on which movement of the cursor or other similar displayed element is controlled by the main controller 56 according to the displacement information provided by the pointing electronic device 1 (it is noted that, in addition to the displacement information, any kind of further information may be communicated between the electronic device 1 and the host apparatus 50).

In particular, the rate upscaling unit 20 of the pointing electronic device 1 according to the present solution may alternatively be implemented: in the inertial measurement module 7; in the main control unit 52; or in the BLE (Bluetooth Low Energy) control unit of the communication interface unit 54.

In various embodiments, the algorithms and methods described herein may be implemented, at least in part, using a processor coupled to a non-transitory computer readable medium, such as a memory. The non-transitory computer readable medium may include instructions executable by the processor to implement embodiment algorithms. The processor may include a central processing unit (CPU), a microprocessor, a microcontroller or other processing circuitry known in the art that is capable of executing machine readable instructions. In alternative embodiments, the algorithms and methods described herein may be implemented using dedicated digital logic, programmable digital logic such as a field programmable gate array (FPGA), a digital signal processor (DSP), or other suitable digital hardware.

The advantages of the solution proposed are clear from the foregoing description. In any case, it is again underlined that the proposed solution provides the ability to achieve a very low power consumption, allowing to use low motion input data rates while keeping high pointer performance; in particular an improved precision and user experience are provided.

Finally, it is clear that modifications and variations may be made to what has been described and illustrated herein, without thereby departing from the scope of the present invention, as defined in the annexed claims.

In particular, it is again underlined that the sensor-fusion processing stage 5 may implement any suitable generic sensor-fusion filter algorithm, to combine the acceleration signal Acc and the gyroscope signal Gyro and to generate at the output the roll estimation quantity $\beta'$ (it is again underlined that the present disclosure is not to be limited to a particular implementation of the sensor-fusion processing stage 5).

Moreover, it is noted that the pointing determination stage 8 may also be implemented as a hardware module and be integrated in the same packaged chip with the MEMS inertial sensors (the accelerometer and gyroscope sensors 2, 4 and possibly further sensors, such as a magnetometer) and with the corresponding processing circuit.

Moreover, it is again underlined that the electronic device 1 may be a dedicated pointer device or may also have other or additional functions.

What is claimed is:

1. A pointing electronic device, comprising:
   an inertial measurement circuit, configured to generate motion input data, the motion input data indicative of motion of the pointing electronic device at an input data rate;
   a pointing determination circuit, configured to:
      implement a pointing algorithm at a processing data rate based on the motion input data, and
      generate screen-frame displacement data corresponding to 3D-space movements of the pointing electronic device, the input data rate being lower than the processing data rate; and
   a rate upscaling circuit, interposed between the inertial measurement module and the pointing determination circuit, the rate upscaling circuit configured to implement a data-rate upscaling of the motion input data to generate upscaled motion input data to be processed by the pointing determination circuit at a data rate matching the processing data rate, via a predictive data reconstruction of missing samples based on the actual motion input data.

2. The device according to claim 1, wherein the rate upscaling circuit is configured to operate at the processing data rate and comprises:
a verification stage configured to acquire the motion input data; and
a data reconstruction stage configured to perform the predictive data reconstruction in case of missing samples of the motion input data, wherein the verification stage is configured to determine, at every cycle of the pointing algorithm implemented by the pointing determination circuit, the need to reconstruct the motion input data and enable the data reconstruction stage to perform the predictive data reconstruction.

3. The device according to claim 2, wherein the verification stage is configured, at every cycle, to:
compare a current sample of the motion input data to a previous sample acquired at a previous cycle; and
enable the data reconstruction stage to perform the predictive data reconstruction in case the current sample exactly matches the previous sample, thus being indicative of a missing sample that has to be reconstructed due to the lower input data rate.

4. The device according to claim 3, wherein the data reconstruction stage is configured to receive the current sample of the motion input data and to generate a reconstructed data sample to be provided to the pointing determination circuit as a function of the current sample and a slope of the motion input data determined based on previous motion input data.

5. The device according to claim 4, wherein the data reconstruction stage comprises a slope computation circuit configured to compute the slope of the motion input data as a difference between the current sample $data_t$ and a previous different sample $data_{t-2}$, the previous different sample being a sample preceding the previous sample, according to the expression slope=$data_t$–$data_{t-2}$.

6. The device according to claim 4, wherein the data reconstruction stage comprises a slope computation circuit configured to compute the slope of the motion input data as a difference between the current sample $data_t$ and a predicted previous different sample $data_{t-2}^{pred}$, the predicted previous different sample being a sample predicted at a previous execution of the data reconstruction stage, according to the expression:

slope=$data_t$–$data_{t-2}^{pred}$.

7. The device according to claim 4, wherein the data reconstruction stage comprises a reconstruction circuit configured to generate the reconstructed data sample $data_t^{pred}$ according to the following expression:

$$data_t^{pred} = data_t + \frac{\text{slope}}{k},$$

where k is a weight factor, $data_t$ is the current sample, with k≥1, designed to weigh a slope contribution in the predictive data reconstruction.

8. The device according to claim 7, wherein the data reconstruction stage further comprises a weight computation branch configured to dynamically compute the value of the weight factor based on a current quantity of motion associated to the motion input data.

9. The device according to claim 8, wherein the weight computation branch comprises a first computation circuit, configured to compute a motion quantity parameter indicative of the current quantity of motion associated with the motion input data based on the slope computed by a slope computation block and the current sample.

10. The device according to claim 9, wherein the weight computation branch further comprises:
an evaluation circuit, coupled to the first computation circuit to receive the motion quantity parameter and compare the motion quantity parameter with a threshold;
a second computation circuit configured to set the weight factor to a minimum value in case the motion quantity parameter is lower than the threshold; and
a third computation circuit configured to compute the weight factor as a function of a ratio between the motion quantity parameter and the threshold in case the motion quantity parameter is higher than the threshold.

11. The device according to claim 10, wherein the first computation circuit is configured to compute the motion quantity parameter according to the following expression:

$$mix_t = \text{abs}\left(\frac{data_t + \text{slope}}{2}\right)$$

and wherein the third computation circuit is configured to compute the weight factor according to the expression:

$$k = \left(mix_t \cdot \frac{d}{thr} + k_{min}\right)$$

where d is a proportionality factor that determines an additional contribution of the ratio between the motion quantity parameter and the threshold with respect to the minimum value for the computation of the weight factor, $k_{min}$ is a minimum value of the weight factor k, and thr is a threshold value.

12. The device according to claim 11, wherein the threshold value, minimum value of the weight factor k, and proportionality factor are determined via a regression analysis.

13. The device according to claim 1, wherein the inertial measurement circuit comprises:
an accelerometer sensor configured to generate an acceleration signal indicative of accelerations acting on the pointing electronic device;
a gyroscope sensor configured to generate a gyroscope signal indicative of angular rates of rotation of the pointing electronic device; and
a sensor fusion processing stage coupled to the accelerometer sensor and gyroscope sensor, the sensor fusion processing stage being configured to generate an orientation estimation quantity indicative of an orientation of the pointing electronic device about a longitudinal axis based on a sensor fusion algorithm envisaging joint processing of the acceleration signal and gyroscope signal,
wherein the pointing determination circuit is configured to receive, as the motion input data, the orientation estimation quantity and the gyroscope signal and implement an orientation-compensation of the gyroscope signal as a function of the orientation estimation quantity to determine a compensated gyroscope signal and generate the screen-frame displacement data corresponding to 3D-space movements of the pointing electronic device based on the orientation-compensated gyroscope signal.

14. The device according to claim 13, wherein the rate upscaling circuit comprises:
a first verification stage configured to receive the orientation estimation quantity;
a second verification stage configured to receive the gyroscope signal; and
a respective data reconstruction stage at the output of the first and second verification stages, the respective data reconstruction stage being configured to perform the predictive data reconstruction in case of missing samples of the orientation estimation quantity and, respectively, of the gyroscope signal, wherein the first and second verification stages are configured to determine, at every cycle of the pointing algorithm implemented by the pointing determination circuit the need to reconstruct the orientation estimation quantity and, respectively, the gyroscope signal by comparing a current sample thereof to a previous sample acquired at a previous cycle and stored in a first storage element and, respectively, in a second storage element.

15. An electronic system comprising:
a host apparatus having a display; and
a pointing electronic device in communication with the host apparatus, the pointing electronic device comprising:
an inertial measurement circuit configured to generate motion input data indicative of motion of the pointing electronic device at an input data rate,
a pointing determination circuit configured to:
implement a pointing algorithm at a processing data rate based on the motion input data, and
generate screen-frame displacement data corresponding to 3D-space movements of the pointing electronic device, the input data rate being lower than the processing data rate,
a rate upscaling circuit interposed between the inertial measurement circuit and the pointing determination circuit, the rate upscaling circuit configured to implement a data-rate upscaling of the motion input data to generate upscaled motion input data to be processed by the pointing determination circuit at a data rate matching the processing data rate via a predictive data reconstruction of missing samples based on the actual motion input data, and
a communication interface circuit configured to transmit the screen-frame displacement data to the host apparatus, wherein the screen-frame displacement data are configured to control movement of a displayed element on a screen frame of the display.

16. The system according to claim 15, wherein the rate upscaling circuit is configured to operate at the processing data rate and comprises:
a verification stage configured to acquire the motion input data; and
a data reconstruction stage configured to perform the predictive data reconstruction in case of missing samples of the motion input data, wherein the verification stage is configured to determine, at every cycle of the pointing algorithm implemented by the pointing determination circuit, the need to reconstruct the motion input data and enable the data reconstruction stage to perform the predictive data reconstruction.

17. The system according to claim 15, wherein the inertial measurement circuit comprises:
an accelerometer sensor configured to generate an acceleration signal indicative of accelerations acting on the pointing electronic device;
a gyroscope sensor configured to generate a gyroscope signal indicative of angular rates of rotation of the pointing electronic device; and
a sensor fusion processing stage coupled to the accelerometer sensor and gyroscope sensor, the sensor fusion processing stage configured to generate an orientation estimation quantity indicative of an orientation of the pointing electronic device about a longitudinal axis based on a sensor fusion algorithm envisaging joint processing of the acceleration signal and the gyroscope signal,
wherein the pointing determination circuit is configured to:
receive, as the motion input data, the orientation estimation quantity and the gyroscope signal, and
implement an orientation-compensation of the gyroscope signal as a function of the orientation estimation quantity to determine a compensated gyroscope signal and generate the screen-frame displacement data corresponding to 3D-space movements of the pointing electronic device based on the orientation-compensated gyroscope signal.

18. A method of generating screen-frame displacement data based on 3D-space movements of a pointing electronic device, the method comprising:
generating motion input data indicative of motion of the pointing electronic device at an input data rate;
implementing a pointing determination algorithm at a processing data rate based on the motion input data, to generate the screen-frame displacement data, the input data rate being lower than the processing data rate; and
upscaling a data-rate of the motion input data to generate upscaled motion input data to be processed by the pointing algorithm at a data rate matching the processing data rate, wherein the upscaling comprises performing a predictive data reconstruction of missing samples based on the actual motion input data.

19. The method according to claim 18, wherein implementing the data-rate upscaling comprises comparing a current sample for the motion input data to a previous sample and, in case the current sample exactly matches the previous sample, thus being indicative of a missing sample, performing the predictive data reconstruction as a function of the current sample and a slope of the motion input data determined based on previous motion input data.

20. The method according to claim 19, wherein
performing the predictive data reconstruction comprises generating a reconstructed data sample $data_t^{pred}$ according to the following expression:

$$data_t^{pred} = data_t + \frac{\text{slope}}{k},$$

where k is a weight factor, $data_t$ is the current sample, with $k \geq 1$, designed to weigh the slope contribution in the predictive data reconstruction, and wherein the method further comprising dynamically computing the value of the weight factor based on a current quantity of motion associated to the motion input data.

* * * * *

UNITED STATES PATENT AND TRADEMARK OFFICE
CERTIFICATE OF CORRECTION

PATENT NO. : 11,592,911 B2
APPLICATION NO. : 17/191320
DATED : February 28, 2023
INVENTOR(S) : Federico Rizzardini It is certified that error appears in the above-identified patent and that said Letters Patent is hereby corrected as shown below:

In the Claims

Claim 1, Column 12, Line 63; delete "module" and insert --circuit--.

Signed and Sealed this
Twenty-eighth Day of March, 2023

*Katherine Kelly Vidal*

Katherine Kelly Vidal
*Director of the United States Patent and Trademark Office*